Jan. 7, 1930. S. M. JACOB ET AL 1,742,394
MANUFACTURE OF SPORTS IMPLEMENTS AND APPARATUS THEREFOR
Filed April 21, 1927
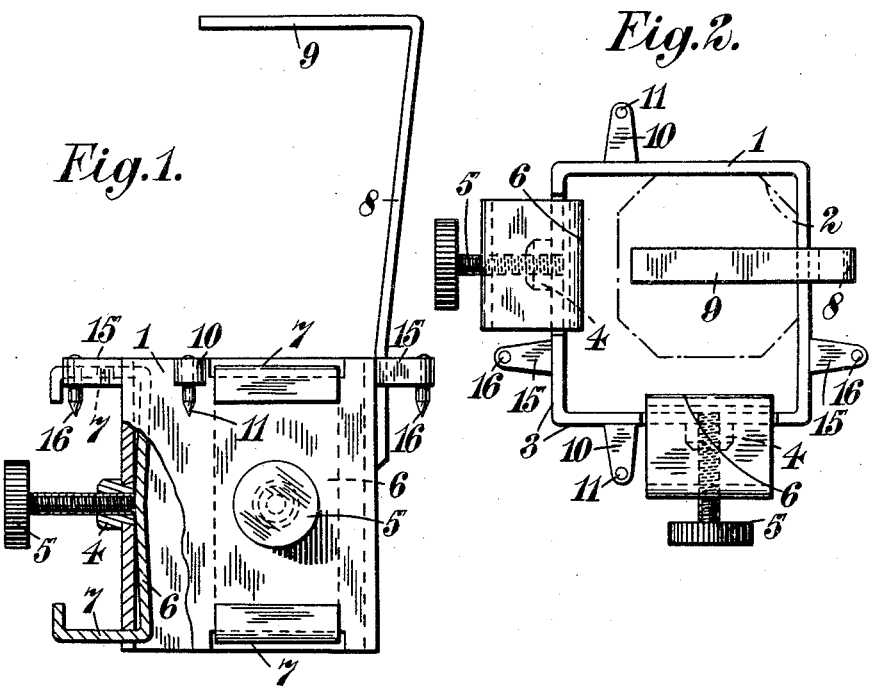
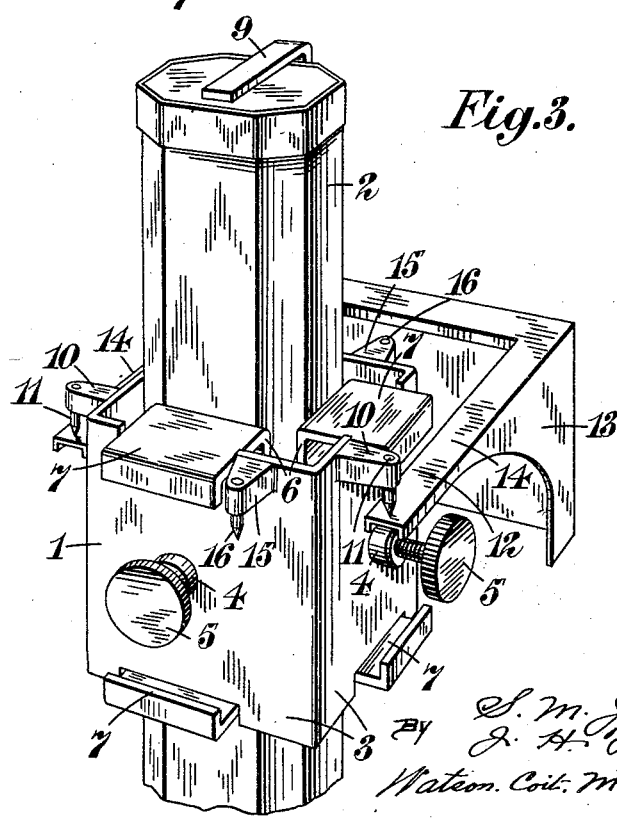

Patented Jan. 7, 1930

1,742,394

UNITED STATES PATENT OFFICE

SYDNEY MONTAGUE JACOB, OF LONDON, ENGLAND, AND JAMES HERMANN FIELD, OF SIMLA, INDIA

MANUFACTURE OF SPORTS IMPLEMENTS AND APPARATUS THEREFOR

Application filed April 21, 1927, Serial No. 185,604, and in Great Britain April 30, 1926.

This invention comprises improvements in or relating to the manufacture of sports implements and apparatus therefor. It is well known that sports implements such for example as tennis racquets, golf clubs, cricket bats and the like should not only be of a suitable weight but that the weight should be so distributed that the racquet or the like "has a good balance". It has not hitherto, however, been appreciated that this balance is a function of the moment of inertia of the implement as it is being swung and that a given recquet may therefore require quite a different force to swing it, from another given racquet, although both may be of the same weight and have their centre of gravity at the same distance from the gripping point. We have found that the true dynamic balance can be determined by swinging the implement in the plane in which the balance is desired to be found about any convenient axis, and noting the period of oscillation. If the axis about which the implement is swung is not coincident with the centre of grip, suitable mathematical corrections can readily be applied.

According to the present invention, a method of manufacture of sports implements (for example tennis or like racquets) is characterized by determining the dynamic balance of an instrument under manufacture by swinging it as a pendulum and adding or removing weight until a desired dynamic balance is attained.

The persent invention also includes apparatus for testing the dynamic balance of sports implements (for example, tennis racquets) comprising in combination an attachment (for example, a clamp) to be secured to the implement, supporting-elements upon the attachment, and a bracket provided with bearings to engage said supporting elements and so to support the attachment that it and the implement can swing thereon. With such an apparatus attached, say, to a tennis racquet it is possible rapidly to determine the period of swing above referred to and from it to determine a number which will accurately express the dynamic balance and will be strictly comparable with a corresponding number found for any other racquet.

The balance of a racquet is not necessarily the same in different planes and the apparatus is conveniently such that the dynamic balance can be readily determined in two different planes at right angles to one another. The present invention, therefore, also comprises apparatus for testing the dynamic balance of sports implements in which there are two sets of supporting-elements upon the attachment, each having a pair of bearing surfaces to ensure the racquet swinging in a definite vertical plane and disposed with their pairs of bearing surfaces in vertical planes which are at a definite angle (for example, a right-angle) to each other.

One form of apparatus, specially designed for the application of the invention to tennis racquets comprises in combination a box-shaped clamp to be secured to the tennis-racquet by means of clamping plates and screws, two sets of downwardly-projecting pins upon said clamp, said sets being disposed in vertical planes which are at right angles to each other, and a bracket comprising two arms spaced apart by a sufficient distance to receive the clamp between them and to form bearings for the pins, said bearings supporting the clamp so that it and the tennis-racquet may be swung upon the bracket either in one vertical plane or in another vertical plane at right-angles to the first plane. A gauge-bar may be provided for determining the distance at which the clamp is fixed from the end of the handle of the implement.

The accompanying drawings illustrate one suitable form of the apparatus—

Figure 1 is a side-elevation, shown partly in section, of the clamp with gauge-bar attached thereto.

Figure 2 is a plan-view of the same clamp.

Figure 3 is a perspective view showing the clamp resting upon the bracket and a portion of the racquet.

Throughout these drawings, like reference numerals indicate like parts.

Referring to Figures 1 to 3, the clamp has a box-shaped brass body portion (1) open at opposite ends and large enough to slip over the handle (2) of a racquet. Two adjacent sides of the box (3) are provided with bosses (4) for clamping screws (5). Between the clamping screws (5) and the handle (2) of the racquet there are interposed clamping plates (6). The length of the clamping plate (6) is approximately equal to the length of the box (1) and as each plate (6) lies loosely against the tip of its corresponding clamping screw it is free to cant in any direction and accommodate itself to the shape of the handle. Each clamping plate is bent backwardly at its ends and turned over to form two flanges (7) which embrace the exterior of the box (1) and prevent detachment of the plate (6). Upon the side of the box (1) there is secured a gauge-bar (8), the end of which (9) is bent at right angles to the direction of the handle of the racquet and serves to locate the apparatus at a suitable distance from the end of the handle.

Close to the upper end of the box and on opposite sides thereof there project two lugs (10) in each of which is mounted a downwardly-projecting pointed pin (11). The two pins are at the same level as one another and constitute point-bearings (12) about which the clamp attachment (1) and racquet (2) will swing as a single rigid body. It should be noted that it is important that the attachment (1) should be secured upon the racquet handle (2) without any possibility of play, which would upset the calculations.

A bracket (13) for supporting this apparatus is provided which comprises two arms (14) spaced apart by a sufficient distance to receive the attachment (1) between them and to support the points of the bearing-pins (11).

A second pair of lugs (15) are also provided upon the attachment mounted upon the other two sides of the box (1). These also carry bearing-pins (16) similar to those previously described, but set in a plane at right-angles thereto. The use of this second set of bearings enables the time of swing in a direction at right-angles to that of the first determination to be effected.

In use tests are made by swinging the racquet and noting the period of swing. If the time is measured over a series of, say, 100 oscillations, a very accurate determination of the period, correct to within about one-thousandth of a second, can be obtained and the figure representing the factor of dynamic balance above referred to can then be accurately calculated.

We claim:—

1. A method of manufacture of sports implements, characterized by determining the dynamic balance of an instrument under manufacture by swinging it as a pendulum about a pivot remote from its center of gravity and adding or removing weight until a desired moment of inertia is obtained.

2. A method of manufacture of tennis racquets, characterized by determining the dynamic balance of the tennis racquet under manufacture by swinging it as a pendulum about a pivot remote from its center of gravity and adding or removing weight until a desired moment of inertia is obtained.

3. Apparatus for testing the dynamic balance of sports implements comprising in combination a clamp to be secured to the implement, supporting-elements upon the clamp, and a bracket provided with bearings to engage said supporting elements and so to support the clamp that it and the implement can swing thereon.

4. Apparatus for testing the dynamic balance of sports implements comprising in combination a clamp to be secured to the implement, a gauge-bar attached to the clamp for determining the distance at which the clamp is fixed from the end of the handle of the implement, supporting elements upon the clamp, and a bracket provided with bearings to engage said supporting elements and so to support the clamp that it and the implement can swing thereon.

5. Apparatus for testing the dynamic balance of sports implements comprising in combination an attachment to be secured to the implement, two sets of supporting-elements upon the attachment, each having a pair of bearing surfaces to ensure the implement swinging in a definite vertical plane and disposed with their pairs of bearing surfaces in vertical planes which are at a definite angle to each other, and a bracket provided with bearings to engage said supporting elements and so to support the attachment that it and the implement can swing thereon.

6. Apparatus for testing the dynamic balance of sports implements comprising in combination an attachment to be secured to the implement, two sets of supporting-elements upon the attachment, each having a pair of bearing surfaces to ensure the implement swinging in a definite vertical plane and disposed with their pairs of bearing surfaces in vertical planes which are at right-angle to each other, and a bracket provided with bearings to engage said supporting elements and so to support the attachment that it and the implement can swing thereon.

7. Apparatus for testing the dynamic balance of sports implements comprising in combination a box-shaped clamp adapted to be secured to the handle of the implement, two sets of downwardly projecting pins upon said clamp, said sets being disposed in vertical planes which are at right-angles to each other, and a bracket comprising two arms spaced apart by a sufficient distance to receive the clamp between them and to form bearings for the pins, said bearings supporting the clamp so that it and the implement may be swung upon the bracket either in one vertical plane or in another vertical plane at right-angles to the first plane.

8. A method of manufacture of sports implements, characterized by determining the dynamic balance of an implement under manufacture by swinging it as a pendulum about a pivot remote frim its center of gravity, noting the period of swing, adjusting distribution of weight, again swinging the implement as a pendulum about the same pivot as before end continuing adjustment of weight until a finite period of swing corresponding to a desired moment of inertia dynamic balance, is attained.

9. A method of manufacture of tennis racquets characterized by determining the dynamic balance of the tennis racquet under manufacture by swinging it as a pendulum about a pivot remote from its center of gravity, noting the period of swing, adjusting the distribution of weight, again swinging the implement as a pendulum about the same pivot as before and continuing adjustment of weight until a desired period of swing corresponding to a desired moment of inertia is attained.

In testimony whereof we have signed our names to this specification.

SYDNEY MONTAGUE JACOB.
JAMES HERMANN FIELD.